US006959015B1

(12) United States Patent
Hwang et al.

(10) Patent No.: US 6,959,015 B1
(45) Date of Patent: Oct. 25, 2005

(54) METHOD AND APPARATUS FOR ALIGNING MULTIPLE DATA STREAMS AND MATCHING TRANSMISSION RATES OF MULTIPLE DATA CHANNELS

(75) Inventors: Jin H. Hwang, Cerritos, CA (US); James C. Chang, Cypress, CA (US); Mark L. Yang, Irvine, CA (US)

(73) Assignee: Crest Microsystems, Cerritos, CA (US)

( * ) Notice: Subject to any disclaimer, the term of this patent is extended or adjusted under 35 U.S.C. 154(b) by 873 days.

(21) Appl. No.: 09/852,819

(22) Filed: May 9, 2001

(51) Int. Cl.[7] .......................... H04J 3/06; H04L 25/00; G06F 1/12
(52) U.S. Cl. ...................... 370/516; 370/503; 370/506; 375/372; 713/400
(58) Field of Search ............................... 370/342, 350, 370/389–469, 470, 473, 476, 474, 516, 503–506, 370/535, 536, 538, 539; 375/372, 341, 365, 375/355, 229, 316, 106; 714/700, 701, 786; 710/100, 300, 305, 311; 711/167; 713/400, 713/503

(56) References Cited

U.S. PATENT DOCUMENTS

| | | | | |
|---|---|---|---|---|
| 5,461,621 A | * | 10/1995 | Little ........................... | 370/470 |
| 5,802,122 A | * | 9/1998 | Niegel ......................... | 375/372 |
| 6,173,380 B1 | * | 1/2001 | Jin et al. ..................... | 711/167 |
| 6,397,367 B1 | * | 5/2002 | Park et al. ................... | 714/786 |
| 6,606,675 B1 | * | 8/2003 | Godbole ...................... | 710/100 |
| 6,636,993 B1 | * | 10/2003 | Koyanagi et al. ........... | 714/700 |
| 6,650,638 B1 | * | 11/2003 | Walker et al. ............... | 370/389 |
| 6,738,393 B2 | * | 5/2004 | Miki et al. ................... | 370/506 |
| 6,771,670 B1 | * | 8/2004 | Pfahler et al. .............. | 370/503 |
| 2002/0122435 A1 | * | 9/2002 | Mundkur et al. ........... | 370/503 |
| 2002/0031202 A1 | * | 2/2003 | Teng ........................... | 370/469 |

* cited by examiner

Primary Examiner—Man U. Phan
(74) Attorney, Agent, or Firm—Blakely Sokoloff Taylor & Zafman LLP

(57) ABSTRACT

The invention provides a novel scheme to align data streams across multiple transmission channels and match multiple transmissions with one receiving rate.

The channel aligning aspect of this invention detects the occurrence of an aligning character in a plurality of input channel character streams, buffers the character stream until an aligning character has been detected on every input channel. The channel aligning system transmits filler characters over every output channel corresponding to an input channel where an aligning character has been received if an aligning character has not been detected on every input channel. The aligning system then synchronously transmits the buffered characters, starting with the aligning character and proceeding with the subsequently received characters.

The rate matching aspect of this invention receives a plurality of character streams synchronized by a first clock and buffers the character streams. Buffered characters are then transmitted over one or more output channels synchronized by a second clock. The rate matching system inserts a filler character in each output channel if an underflow condition is detected and removes a filler character from each output channel if an overflow condition is detected.

44 Claims, 14 Drawing Sheets

Rate Matching Buffer

| Data in Buffer (max / min) | BufferData Count | Description |
|---|---|---|
| 7 / 6 | 7 | Overflow |
| 6 / 5 | 6 (max. threshold) | Skip pending |
| 5 / 4 | 5 | Do nothing |
| 4 / 3 | 4 (initial value) | Do nothing |
| 3 / 2 | 3 | Do nothing |
| 2 / 1 | 2 (min. threshold) | Insert pending |
| 1 / 0 | 1 | Underflow |

Figure 8

| Sub-Block Name | Description |
| --- | --- |
| Sync wclk | Synchronizer, to synchronize the reset to wclk domain. The synchronized reset is used as FIFO write enable. |
| Sync rfwclk | Synchronizer, to synchronize the reset to rfwclk domain. |
| Read pointer 0 GEN | Channel 0 read pointer. When insertion takes place, read pointer value will stay unchanged. When flush takes place, read pointer will be updated by the next expected pointer "nexp_rptr0". |
| Nexp rptro GEN | Next expected read pointer mapping table |
| FIFOzDCNT0 | Channel 0 FIFO Data Counter |
| DET0 | Channel 0 Align Character detector. |
| Write pointer 0 GEN | Channel 0 write pointer. |
| WAFIFO 0 | Word Alignment Channel 0 FIFO, a 10 x 11-bit FIFO. IQ: The next FIFO output data. |
| AND4 | Four input AND gate. |
| A Space cnt | Data skew counter. It counts from 0 to 7. When it equals to 7 and "A" characters ed, FIFO will be flushed. |
| ACT GEN | Word alignment active generator. A combinational logic. |
| INSERT GEN | Insert generation. A combinational logic. |
| Flush GEN | Flush generation. A combinational logic to flush stalled FIFO data. When data skew is greater than 8 columns, FIFO will be flushed to prevent from overflow. |

Figure 9B

|  | Block Signal Interface |  |
|---|---|---|
| Input Declaration |  |  |
| input | wclk0; | //write clock for channel 0 |
| input | wclk1; | //write clock for channel 1 |
| input | wclk2; | //write clock for channel 2 |
| input | wclk3; | //write clock for channel 3 |
| input | rfwclk; | //reference write clock |
| input | resetn; | //asynchronous reset |
| input | wa-enable; | //word alignment enable |
| input | mode0; | //mode 0 |
| input [3:0] | sync_status; | //synchronous status |
| input [3:0] | dec_byp; | //bypass decoder |
| input [9:0] | data_in0; | //channel 0 input data |
| input [9:0] | data_in1; | //channel 1 input data |
| input | data_in2; | //channel 2 input data |
| input [9:0] | data_in3; | //channel 3 input data |
| input | rxrstl | //receiver reset low assertion |
| Output Declaration |  |  |
| output | wa_deskew; | //deskew status |
| output [9:0] | wa_out0; | //channel 0 output data |
| output [9:0] | wa_out1; | //channel 1 output data |
| output [9:0] | wa_out2; | //channel 2 output data |
| output [9:0] | wa_out3; | //channel 3 output data |
| output | wa_decbyp; | //decoder bypass |
| output | data_skew_err; | //data skew error |

|  | FIFO Signal Interface |  |
|---|---|---|
| Input declaration |  |  |
| input | wclk; | //write clock |
| input [3:0] | wptr; | //write address 0-11 |
| input [9:0] | din; | //incoming write data |
| input | we; | //write strobe, low assertion |
| input | rclk; | //read clock |
| input [3:0] | rptr; | //read address pointer |
| input | insr; | //insert R |
| input | decbyp; | //decoder bypass 1: bypass 0: enable |
| Output declaration |  |  |
| output [9:0] | dout; | //read data |
| output | a_flag; | //indicate the next FIFO output data is an "A" character |

|  | Next Reader Pointer Calculation Look-up Table |  |
|---|---|---|
| input declaration |  |  |
| input [3:0] | rptr; | //current read pointer |
| input [2:0] | fdcnt; | //current FIFO data count |
| output declaration |  |  |
| output [3:0] | nexp_rptr; | //next expect read pointer |

Figure 9C

Figure 8: Rate Matching RTL Block Diagram

| Sub-Block Name | Description |
| --- | --- |
| SYNC1 | Synchronizer, to synchronize the reset to "rfwclk" domain. The output of the synchronizer is the FIFO write enable. |
| INC2 GEN | Increment by-two generator. Therefore, write enable can be recognized by "rclk side. |
| SYNC2 | Synchronizer, to synchronize the increment by two "inc2_rfwclk" to rclk domain. |
| RDENA GEN | Read enable generator. |
| RPTR GEN | Read pointer generator. If insr = 1, read pointer stays unchanged. If skip = 1, read pointer will increment by two. Otherwise, increased by 1 on the clock edge. |
| DET | Detect IDLE characters and IDLE misalign at input stage. If 4 IDLEs are detected, insr_ena = 1. If wa_deskew = 1 and 4 R are detected or wa_deskew = 0 and 4 IDLEs are detected, skip_ena = 1. If detect IDLE misaligned, imisa_det = 1. |
| PIPELINED REG | The result of detector and data are registered (pipelined) prior written into the FIFO. |
| RMFIFO | Used to store data and the result of detection. Write data into the FIFO when write enable is asserted. Output data is addressed by the read pointer and clocked out on the next rising edge of rclk. If " insr" is asserted, 4 R will be presented at FIFO output regardless the value of the read pointer. IQ is the next data to be clocked out. 4 R can be inserted when bit-41 of IQ (insr_flag) is asserted. NIQ can be skipped when bit-42 of NIQ (skip_flag) is asserted. |
| 4T | The width of IDLE misalign flag "imisa_flag" is extended to 4 rclk cycles wide for MDIO. |
| WPTR GEN | Write pointer generator |
| FIFO DCNT | FIFO Data CouNTer. The value of next FIFO data count is the sum of the current FIFO data count + (1 if insr else 0) + (2 if inc2 else 0) + (-1 if skip else 0) + (-1 if rdena else 0). |
| INSR GEN | Insertion generator, insr =1 when all following condition are true: 1) rm_enable =1 (rate matching enable is asserted). 2) fdcnt = 2 or fdcnt-ld = 2 (the current or previous FIFO data count equals to the minimum threshold (2). 3) !insr-ld, not just inserted. (To avoid consecutive insertion) 4) unsr_flag = 1 (permission to insert, R will be inserted within IPG) |
| SKIP GEN | Deletion (skip) generator, skip = 1 when all the following condition are true: 1) rm_enable = 1 (rate matching enable is asserted). 2) fdcnt = 6 or fdcnt_ld = 6 (the current or previous FIFO data count equals to the maximum threshold (6). 3) !skip_ld, not just skipped. (To avoid consecutive deletion). 4) skip flag = 1 (permission to skip, R column is available for skipping) |
| FCNTR ERR GEN | FIFO Data Counter Error Generator. To report FIFO overflow or underflow. |
| NRPTR GEN | Next read pointer generator. |

Figure 10B

|  | Block Signal Interface |  |
| --- | --- | --- |
| Input declaration |  |  |
| input | rfwclk; | //reference write clock |
| input | rclk; | //read clock |
| input | reseln; | //synchronous (rclk) reset |
| input | rm_enable; | //rate matching enable |
| input | dec_byp; | //by pass decoder |
| input [9:0] | rm-din0; | //rate matching channel 0 input data |
| input [9:0] | rm_din1; | //rate matching channel 1 input data |
| input | rm_din2; | //rate matching channel 2 input data |
| input | rm_din3; | //rate matching channel 3 input data |
| input | wa_deskew; | //deskew status |
| input | rxrst; | //receiver local reset |

| Output declaration |  | Description |
| --- | --- | --- |
| output [9:0] | rm_dout0; | //rate matching channel 0 output data |
| output [9:0] | rm_dout1; | //rate matching channel 1 output data |
| output [9:0] | rm_dout2; | //rate matching channel 2 output data |
| output [9:0] | rm_dout3; | //rate matching channel 3 output data |
| output | idle_misalign; | //idle character misaligned |
| output | rm_fentr_err; | Rate matching FIFO date counter error |
| output | deskew_status; | //deskew status |

| FIFO Signal Interface |  |  |
| --- | --- | --- |
| Input declaration |  |  |
| input | wclk; | //write clock |
| input | rclk; | //read clock |
| input | rstn; | //reset low assertion, sync to rclk |
| input [2:0] | wptr; | //write address 0 - 11 |
| input [43:0] | din; | //incoming write data |
| input | we; | //write strobe, low assertion |
| input [2:0] | rptr; | //read address pointer |
| input [2:0] | n_rptr; | //next read address pointer |
| input | insr; | //insert R |
| input | wa_deskew; | //WA deskewed |
| input | decbyp; | //decoder bypass, used to insert R |

| Output declaration |  |  |
| --- | --- | --- |
| output [41:0] | dout; | //current FIFO output data, de-skew status, and idle misalign flag |
| output | insr_flag; | //insertion flag, to indicate the next FIFO output date are IDLE characters |
| output | skip_flag; | //skip flag, to indicate the next FIFO output date is delete-able |

Figure 10C

METHOD AND APPARATUS FOR ALIGNING MULTIPLE DATA STREAMS AND MATCHING TRANSMISSION RATES OF MULTIPLE DATA CHANNELS

FIELD

The invention pertains generally to integrated circuit technology and to integrated circuits used in data communications. More particularly, the invention relates to a method and apparatus for aligning multiple data channels and matching multiple transmissions with one receiving rate.

BACKGROUND OF THE INVENTION

Recent developments in data communications have created the need for increasing the amount and speed of data transmitted. As the volume of data communicated increases, there is an increased desired for greater transmission speeds over various media. One limitation to greater transmission speeds is the decreased reliability of data signals at high speeds. That is, high speed transmission of digital data is limited by the reliability of cost effective transmission media.

One approach for overcoming this limitation has been the use of multiple parallel data channels. Multiple parallel data channels allow transmission in parallel over multiple carriers and/or media rather than in series over a single transmission medium. The effective transmission speed is then approximately the product of the single channel rate and the number of multiple channels. Generally, this allows much higher transmission rates over conventional media but requires more transmission channels.

Digital communication networks are one place where higher transmission speeds are desirable. Data is often broken into smaller segments, or packetized, at a transmitting device before it is transmitted over the network. A receiving device reconstructs the packets to rebuild the data into its original form. The packets may be transmitted over multiple physical or logical channels from the transmitting device to the receiving device on the network.

Each channel may represent a different transmission path between two or more devices on the network. All channels may comprise the same transmission medium or each channel may comprise a different transmission medium. Channel media may include twisted pair, coaxial cable, fiber optic, and/or air.

Ideally, packet transmissions would be synchronized throughout the network. However, it is often impractical or impossible to synchronize data transmissions between multiple devices and over multiple channels. In many cases it may not be possible to provide a single synchronizing clock to all devices on the network.

Even with synchronous transmissions over multiple channels, the different physical and/or logical channels employed may cause data packets to become skewed or misaligned. Generally, in order to process the received data, the packets must be aligned by the receiving device.

Another problem with multi-channel transmission schemes is the inherent rate differences between clocks. That is, even clocks with the same specified frequency have small differences or errors over many cycles. Over time, these small errors may result in processing errors of data received over multiple channels. For instance, differences between the write clocks for each transmission channel and the read clock at the receiving side may result in skipping or corrupting data at the receiving side.

Accordingly, there is a need for a method and/or apparatus that can align the data received over multiple channels and match the frequencies of transmitting and receiving clocks.

BRIEF DESCRIPTION OF THE DRAWINGS

FIG. 8 illustrates the operation of one embodiment of the rate matching system.

FIG. 9B provides a legend of the components of the block-level diagram of FIG. 9A.

FIG. 9C provides a legend of the inputs and outputs for the components of the block-level diagram of FIG. 9A.

FIG. 10B provides a legend of the components of the block-level diagram of FIG. 10A.

FIG. 10C provides a legend of the inputs and outputs for the components of the block-level diagram of FIG. 10A.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and/or circuits have not been described in detail so as not to unnecessarily obscure aspects of the present invention.

Some aspects of the invention provide a novel scheme to align data received from multiple transmission channels and compensate for differences in transmit and receive clock frequencies.

Figure 1:
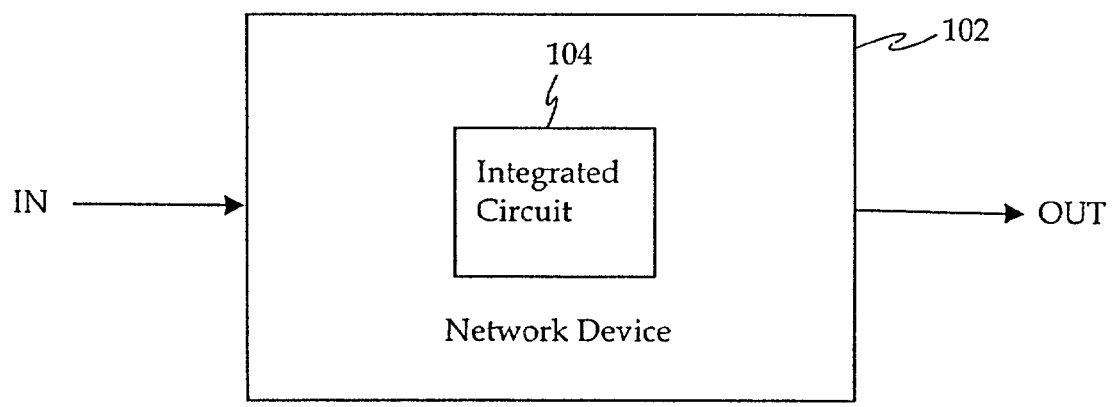
FIG. 1 is a block diagram illustrating one embodiment of a network device where the invention may be employed.

FIG. 1 illustrates how the invention may be practiced on a network device 102. The network device 102 may comprise an input port, with one or more data channels, to receive data, an integrated circuit 104 configured to receive and process the data according to the invention, and an output port to transmit data using one or more data channels.

In one embodiment, the network device 102 may be part of a computer, server, or other electronic device. In various implementations, the invention may be embodied within a multi-component circuit, one or more integrated circuit devices, one or more computer instructions, and/or a machine-readable medium.

Figure 2:
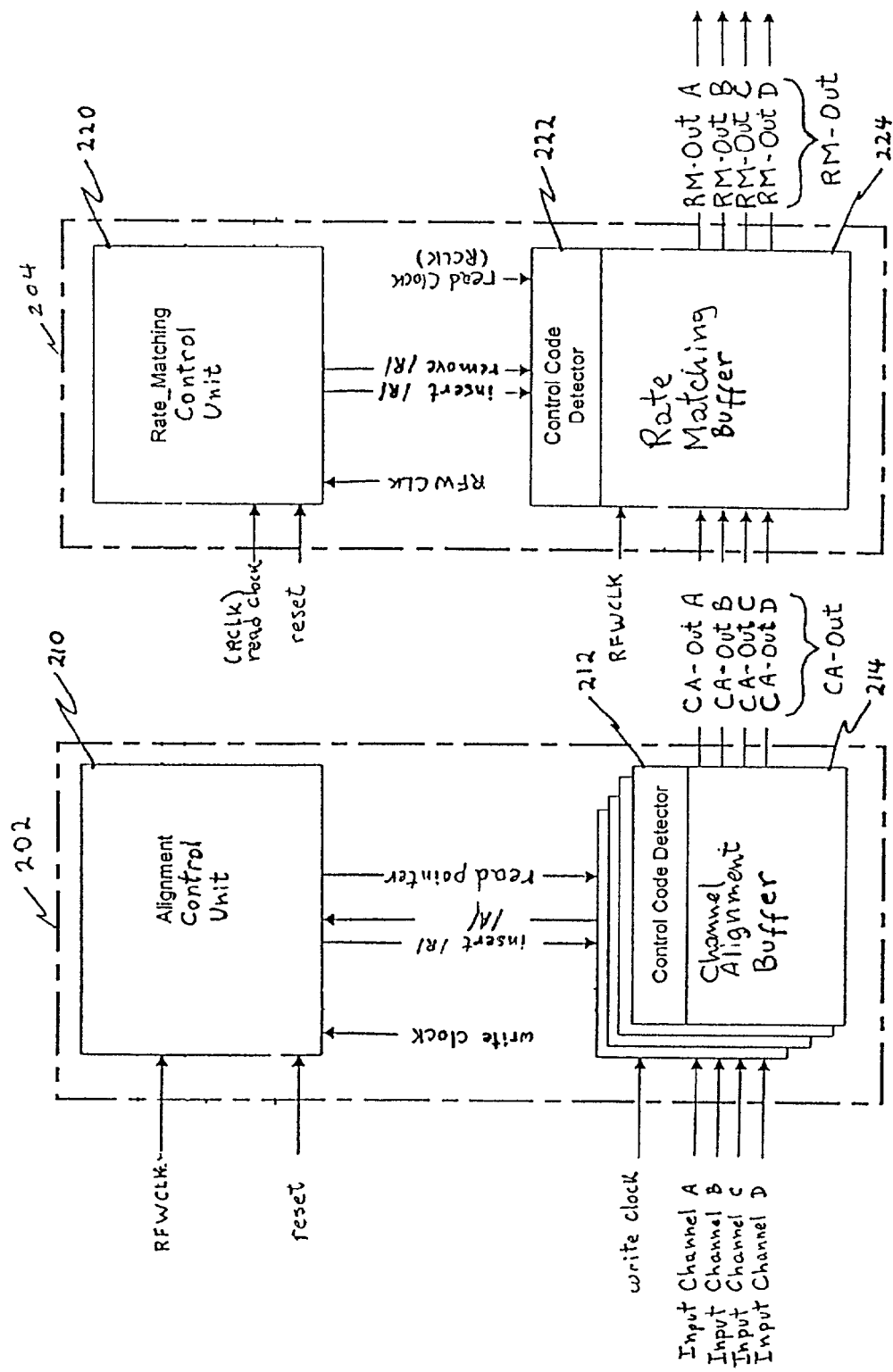
FIG. 2 is a block diagram illustrating one embodiment of a device comprising the invention.

FIG. 2 provides a system-level view of one embodiment of the invention. In one implementation, the system in FIG. 2 represents a portion of the integrated circuit 104 of FIG. 1. For purposes of illustration, a channel aligning aspect 202 and a rate matching aspect 204 of the invention are represented as separate systems. However, it must be clearly understood that the invention is not limited to separate systems for these two aspects of the invention.

In one embodiment of the invention, the channel aligning system 202 comprises an alignment control unit 210, a control code detector 212 for each channel, and a data buffer 214 for each input channel A, B, C, and D.

The alignment control unit 210 may be any number of devices including a general purpose processor, an application specific processor, a programmable device, and an application specific integrated circuit.

Similarly, the control code detector 212 may be any number of devices including a processor, an application specific integrated circuit, or other electronic device capable of detecting a particular character and/or bit pattern in a character stream or memory storage location.

The data buffer 214 may comprise any number of permanent or temporary memory storage devices to store one or more characters.

For purposes of illustration, 10Gbase-X Ethernet-compliant data frames will be used. The Institute of Electrical and Electronics Engineers (IEEE) Standard 802.3, 1998 edition and IEEE Draft P802.3ae/D1.0 are incorporated herein by reference. The IEEE 802.3 Standard specifies a physical coding sublayer (PCS). The invention may be part of an elastic receiving buffer which implements the standards specified by the PCS. It must be clearly understood however, that the invention is not limited to implementations of this standard and/or the elastic buffer and may be practiced with other standards, past, present, or future, and/or other devices.

Figure 3:
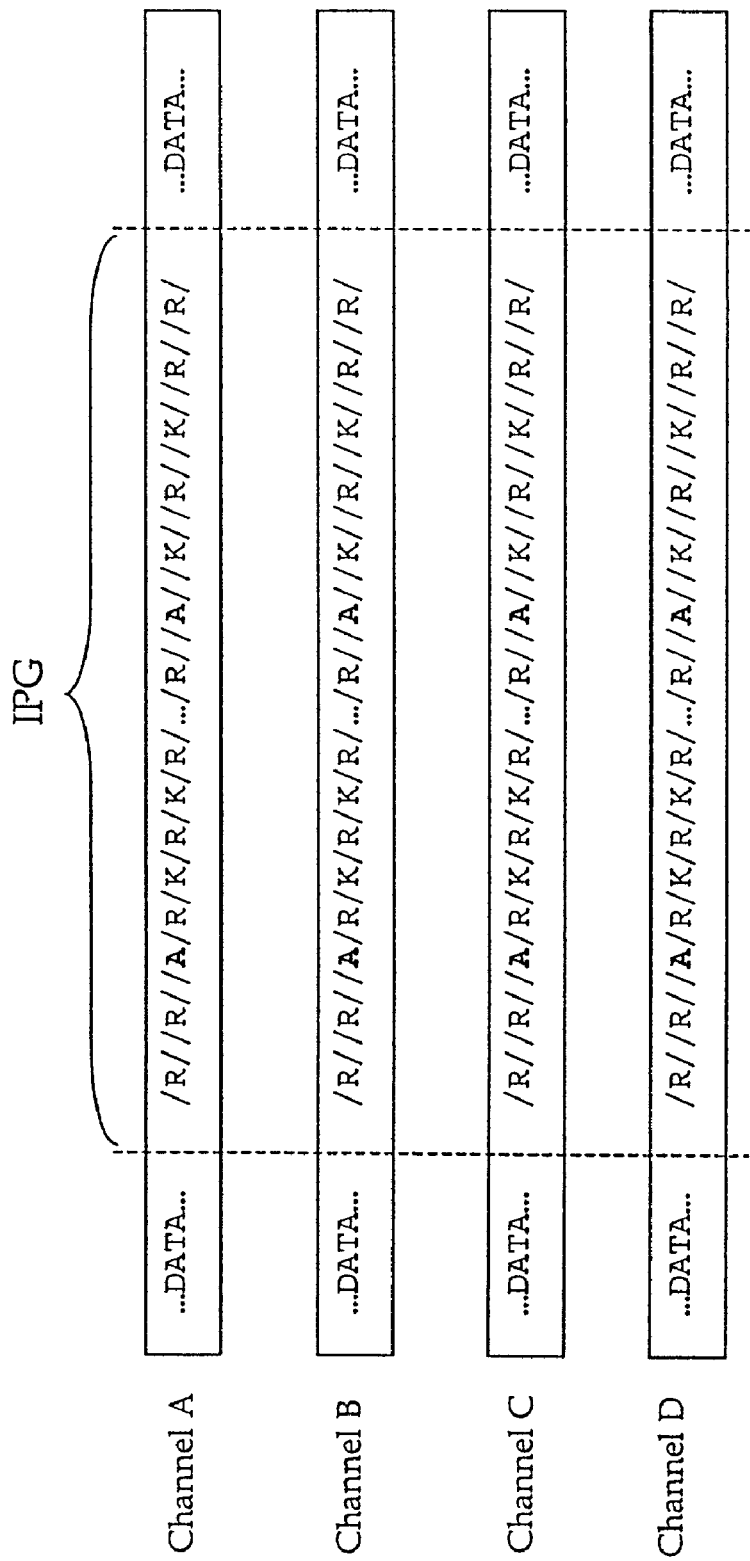
FIG. 3 illustrates the format of data streams received by the device of FIG. 2.

FIG. 3 illustrates an example of Ethernet-compliant data frames as they would appear across four data channels. Each channel transmits data interleaved with control characters. The length or number of control characters and the frequency with which such characters are transmitted and/or interleaved may vary depending on the particular application.

Under the 10Gbase-X Ethernet-compliant standard, data packets are interleaved with one or more control or idle characters within an Inter-Packet-Gap (IPG). An IPG comprises one or more control or idle characters. Control or idle characters are generically denoted as /I/, and include characters /A/ (Align), /K/ (Synchronization), and /R/(Skip or Removable). As illustrated in FIG. 3, the IPG may comprise one or more idle characters including /A/, /K/, and /R/.

Particular control or idle characters may be uniquely or randomly located within an IPG. When the same IPG is transmitted across multiple channels, as illustrated in FIG. 3, the unique location of the particular character(s) may be utilized to align the data over the multiple channels. Hereafter, the particular control or idle characters used for alignment purposes may be referred to as aligning characters. For example, in FIG. 3, a number of alignment characters /A/ may be randomly located within the IPG. At the receiving side, one or more of the /A/ characters may be employed to align all channels in which the same IPG has been transmitted. In one embodiment, multi-channel alignment may be accomplished by different IPGs, in one or more transmission channels, with the same aligning characters in the same location within the IPGs.

Data across all transmission channels is said to be aligned, synchronized, or columnized when one character is transmitted in each channel at the same time reference or clock cycle. A column refers to the characters in every transmission channel driven by the same clock source on the same clock cycle. Thus when all four channels in FIG. 3 are synchronized, a column of four alignment characters /A/ is transmitted on the same clock cycle.

The minimum and maximum length of an IPG may vary according to the application. Generally, the IPG length must be large enough to include sufficient idle and alignment characters to enable the alignment process to function but small enough to avoid interfering with data transmission efficiency. Additionally, the minimum frequency of an aligning character, such as the /A/ idle character, within an IPG may be specified and its location and/or spacing within the IPG may be predefined.

According to one embodiment, the minimum length IPG in each transmission channel must contain at least four aligning characters /A/ and sixty-four idle characters in total. For multiple transmission channels, the aligning character /A/ spacing in the IPG is randomized in the range of sixteen (16) to thirty-two (32) columns. That is, the spacing between aligning characters /A/ may be as little as sixteen (16) idle columns or as much as thirty-two (32) columns in an IPG.

The alignment process starts when a first aligning character is received on any input channel. In one embodiment of the invention, the aligning process is started when a first aligning character /A/ is received in any of the input channels during an IPG transmission. The alignment process succeeds when an alignment character /A/ is received in every input channel within a maximum number of clock cycles.

Figure 4A:
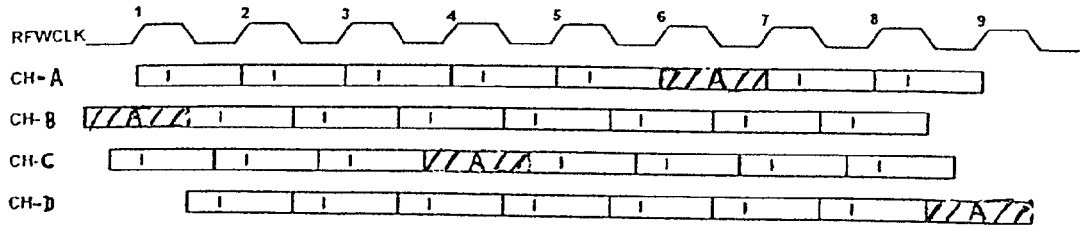
FIG. 4A illustrates a first example of skewing of multiple transmission channels.
Figure 4B:
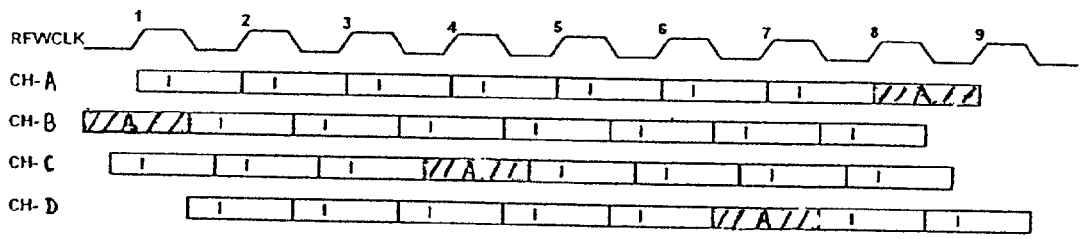
FIG. 4B illustrates a second example of skewing of multiple transmission channels.
Figure 4C:
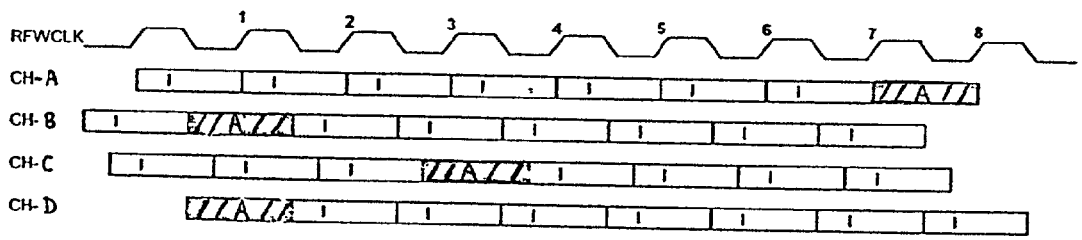
FIG. 4C illustrates a third example of skewing of multiple transmission channels.

FIGS. 4A, 4B, and 4C illustrate four transmission channels, channels A, B, C, and D, each containing part of the same IPG. The IPG contains at least one aligning character /A/ and multiple other idle characters denoted by /I/. These channels may correspond to channels A, B, C, and D shown in FIG. 2.

FIG. 4A illustrates the possible skewing across four channels. In order to determine when the alignment process has failed, a maximum skew must be chosen. The maximum skew is defined as the maximum number of characters or clock cycles between the first received aligning character in a channel and subsequently received aligning characters in other channels.

For purposes of the example illustrated in FIGS. 4A–C, the maximum skew is eight (8) characters.

Accordingly, assuming each channel is read on the rising edge of each reference write clock cycle (RFWCLK), the aligning character /A/ in channel B, being first in time, would be detected first and the alignment process would begin at the first clock cycle. The subsequent aligning characters /A/ across channels C and A would be similarly detected on the rising edge of the fourth and seventh clock cycles respectively. However, detection of the last aligning character /A/ on channel D does not occur until the rising edge of the ninth clock cycle, more than the maximum skew of eight clock cycles or characters. Therefore, the aligning process would fail.

FIG. 4B illustrates a second example of channel skewing. The first aligning character /A/ in channel B would be detected on the rising edge of the first clock cycle and the alignment process would begin. The subsequent aligning characters /A/ across channels C and D would be detected on the rising edge of the fourth and seventh reference clock cycles respectively. However, detection of the last aligning character /A/ on channel A would not occur within the maximum skew of eight characters; it is detected on the ninth clock cycle since the last aligning character /A/ occurred concurrent with the rising edge of the eighth clock cycle. Hence the alignment process would fail. Note that, in this example, when the aligning character arrives concurrent with the rising edged of the reference write clock, it is not clocked in until the next clock cycle. This recognizes the fact that latencies in components of digital systems often result in delays in recognizing an input signal.

FIG. 4C illustrates a third example of channel skewing. Here, the first two aligning characters /A/ on channels B and D would be detected on the rising edge of the first clock cycle and start the alignment process. As before, the third aligning character /A/ on channel C would be detected on the rising edge of the third clock cycle. The last aligning character /A/ would be detected on the eighth clock cycle, within the maximum skew of eight characters. In this case, the alignment process would succeed.

Figure 5:
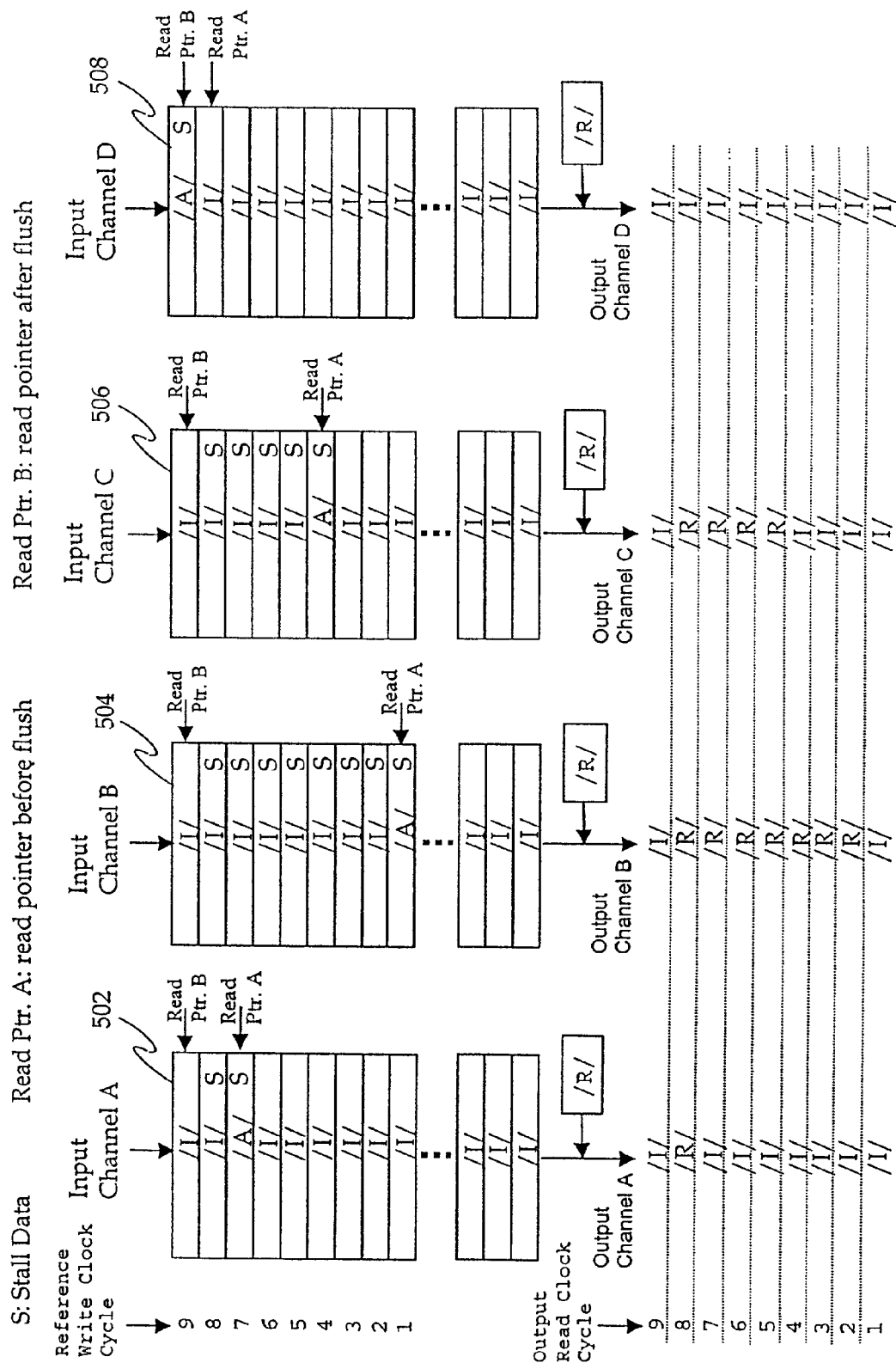
FIG. 5 illustrates how, in one embodiment, the invention may buffer the channel streams of FIG. 4A to align multiple data streams.

FIG. 5 illustrates one embodiment of a buffer system of the invention where each channel has a dedicated buffer 502, 504, 506, and 508. As aligning characters /A/ are received on each input channel, the characters are buffered. The input channels A, B, C, and D and corresponding buffers 502, 504, 506, and 508, illustrated in FIG. 5, may represent the corresponding channels and idle character stream in FIG. 4A. In this illustration, the buffers 502, 504, 506, and 508 may be first-in, first-out (FIFO) stacks. As characters are received, they are pushed onto the buffer corresponding to the input channel as a stack of data. The first-in-time characters are pushed further down on the buffer as new characters are received on the corresponding input channel.

In the illustration of FIG. 5, input channel B receives the first aligning character /A/ on the first reference write clock cycle. Once an aligning character is detected on a particular input channel, the read pointer (Read Ptr. A) for the corresponding buffer is stalled and filler characters (one or more idle characters /R/ for example) are inserted at the output channel of the corresponding buffer until the last aligning character is detected or the alignment process fails. Thus, the read pointer (Read Ptr. A) on the buffer 504 for channel B is set to point to the aligning character /A/ while other characters are received on the buffer 504. The aligning system inserts and transmits filler characters /R/ over the output channel for the corresponding buffer 504 on each read clock cycle. This continues until the last aligning character is received or the alignment process fails.

Likewise, the same procedure is followed for all other channels and buffers until the last aligning character is received or the alignment process fails. FIG. 5 illustrates the case were the alignment process fails because the last aligning character /A/ arrives on channel D beyond the maximum skew of eight characters.

When the alignment process fails, the alignment character /A/ was not detected in all other channels within 8 cycles from the first /A/ being detected, then each buffer is flushed, all stalled read pointers (Read Ptr. A) are released and advanced to the un-stalled value (Read Ptr. B). As depicted in FIG. 5, the new read pointers (Read Ptr. B) for channel A go from reference write clock 7 to 9, for channel B from reference write clock 1 to 9, for channel C from reference write clock 4 to 9, and for channel D from reference write clock 8 to 9.

In one embodiment, after flushing the buffers and/or resetting the read pointers, the alignment process may restart when the next aligning character /A/ is detected on any of the channels. So that lagging aligning characters from a previous alignment process are not mistaken as the start of a new alignment process, it is desirable to adequately space alignment characters within an IPG separately from each other. For example, where a maximum skew of 8 characters is utilized, a minimum spacing of sixteen characters between alignment characters may be implemented.

Figure 6:
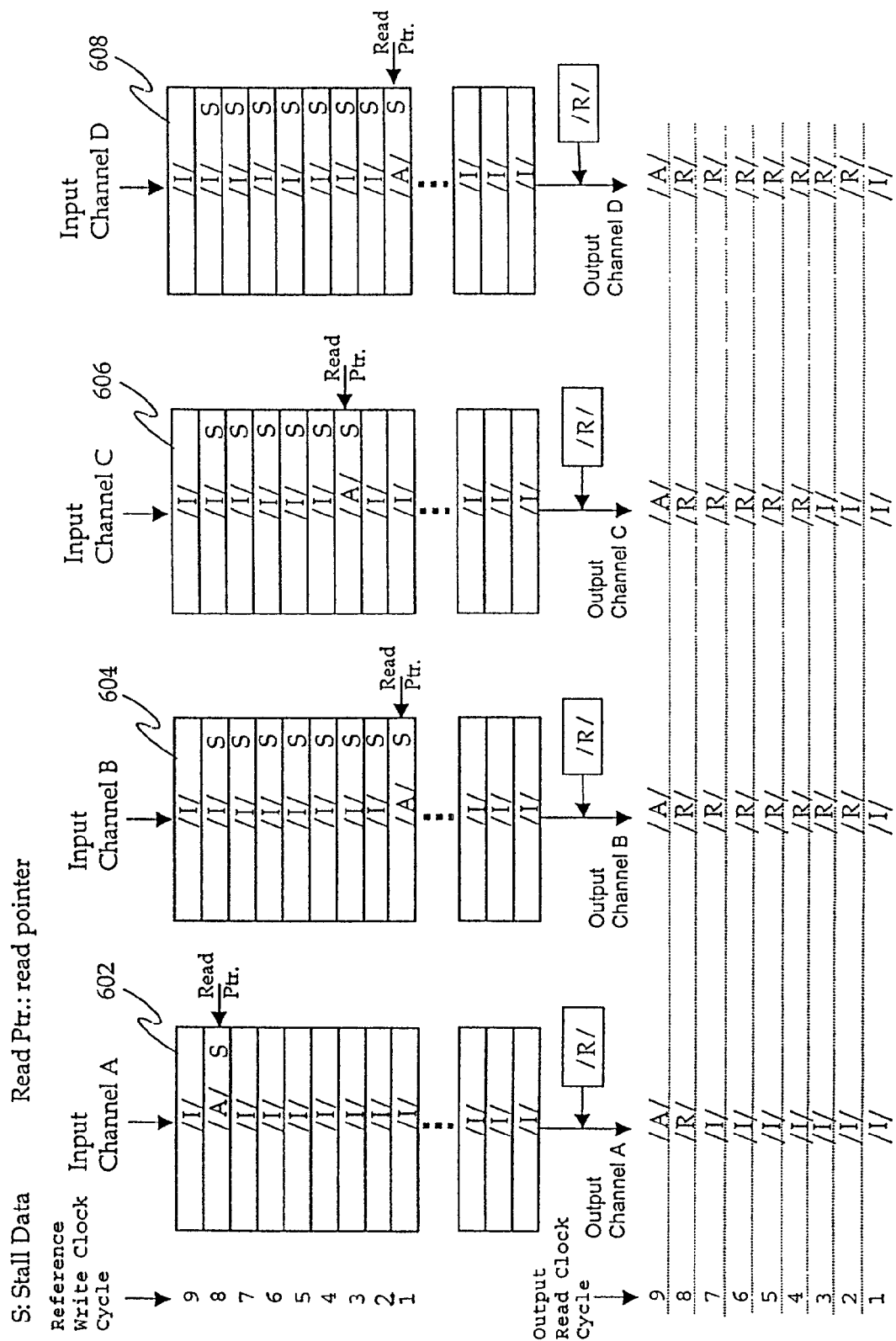
FIG. 6 illustrates how, in one embodiment, the invention may buffer the channel streams of FIG. 4C to align multiple data streams.

FIG. 6 illustrates how, in one embodiment of the invention, the alignment system operates to align multiple transmission channels. The input channels A, B, C, and D and corresponding buffers 602, 604, 606, and 608, may represent the corresponding channels and idle character stream in FIG. 4C. If all aligning characters /A/ are detected within the maximum skew, then the system may align all channels by aligning all read pointers (Read Ptr.). As shown in FIGS. 6 and 4C, by the eighth reference clock cycle all four alignment characters have been detected and buffered. Thus, on the next output clock cycle, the alignment system may start outputting the characters in each buffer stack 602, 604, 606, and 608 at the same time over the corresponding output channels A, B, C, and D, starting from the location of each corresponding read pointer (Read Ptr.) and proceeding through the subsequently received characters on the buffers 602, 604, 606, and 608. Thus, output channels A, B, C, and D for buffers 602, 604, 606, and 608 may all carry aligning character /A/ starting on the ninth output read clock cycle.

After successful alignment of the transmission channels, all output channels A, B, C, and D carry the same pattern of idle characters at the same output read clock cycle.

Note that the particular output read clock cycle on which the aligning characters /A/ are sent to the output channels A, B, C, and D may vary depending on the specific implementation. In one implementation, the buffered characters may be sent to each corresponding output channel concurrent with the detection of the last aligning character at the input channel. In other implementations, the buffered characters may be sent to their corresponding output channels one or more clock cycles after the detection of the last aligning character.

Even after all output channel data streams have been aligned, the problem of small differences in clock frequencies between the reference write clock and read clock remains. In one embodiment, the reference write clock may be taken from one of the input channels.

Once the alignment system 202 (FIG. 2) has successfully aligned all the transmission channels, the output channels, CA-Out (FIG. 2) for instance, may be coupled to a rate matching system 204 (FIG. 2) for further processing of the data streams.

Referring again to FIG. 2, one embodiment of the rate matching system 204 includes a control unit 220, a control code detector 222, and a data buffer 224. The control unit 220 may be any number of devices including a general purpose processor, an application specific processor, a programmable device, and an application specific integrated circuit. Similarly, the control code detector 222 may comprise any number of devices including a processor, an application specific integrated circuit, and/or other electronic devices capable of detecting a particular character and/or bit pattern in a character stream or memory storage location. The data buffer 224 may comprise any number of permanent or temporary memory storage devices to store one or more characters.

Figure 7A:
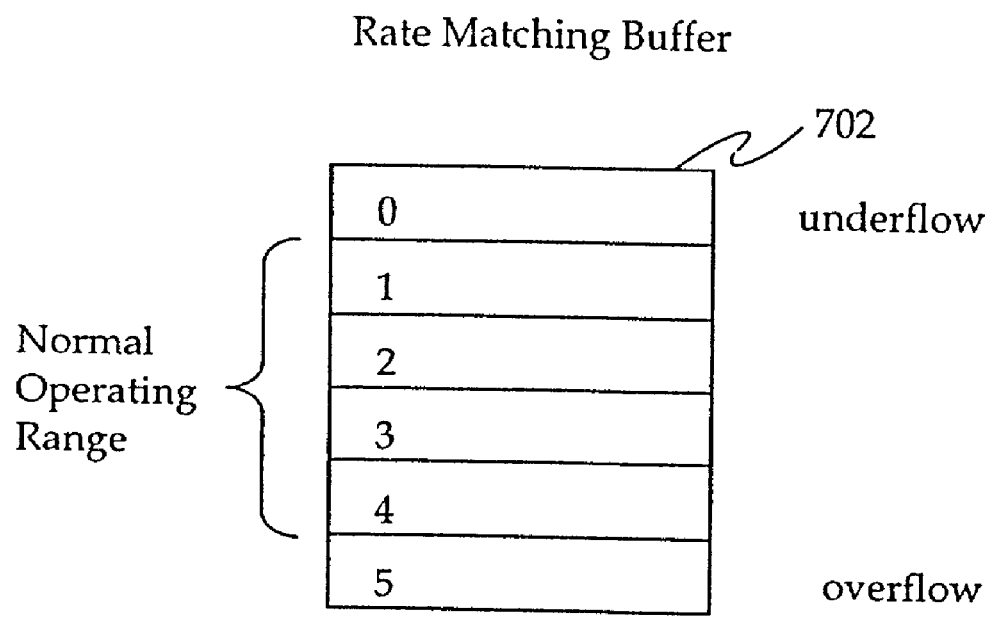
FIG. 7A illustrates one example of a buffer for the rate matching aspect of the invention.

FIG. 7A illustrates one embodiment of the rate matching buffer 224 (FIG. 2) for the rate matching system 204 (FIG. 2). The buffer 224 may be a FIFO buffer stack 702 six storage elements long.

Figure 7B:
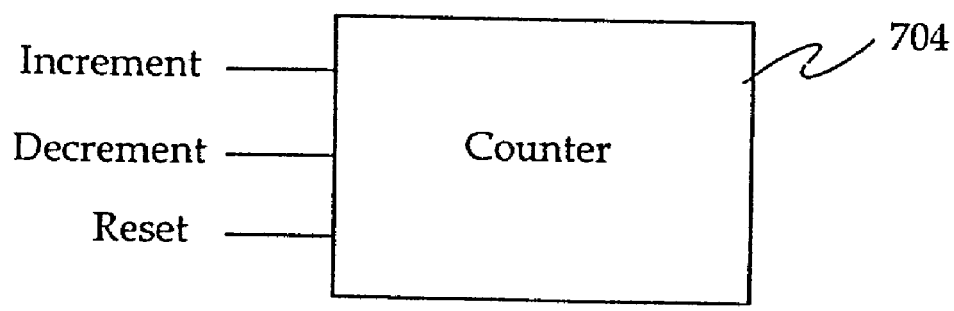
FIG. 7B illustrates one embodiment of a buffer data counter for the rate matching aspect of the invention.

The rate matching control unit 220 (FIG. 2) may include one or more counters to monitor the number and type of characters received and/or stored at the buffer 224 (FIG. 2). FIG. 7B illustrates a buffer data counter 704 with increment, decrement, and reset control inputs. The rate matching system 204 (FIG. 2) may include similar counters which keep track of how many characters have been written to the buffer 224 (FIG. 2), how many characters have been removed from the buffer 224, and/or how many characters remain in the buffer 224.

The rate matching process is started when the rate matching control code detector 222 (FIG. 2) detects aligning characters in all its input channels on the same clock cycle. According to one embodiment, the characters received by the rate matching system 204 (FIG. 2) on the same clock cycle are stored on the same storage element of the FIFO buffer stack 702. In other embodiments, the rate matching buffer 224 (FIG. 2) may be configured as multiple buffers and may receive each character on a different storage element.

Frequency differences between a reference write clock (RFWCLK) and a read clock (RCLK) may be compensated by the rate matching system 204 (FIG. 2) by either inserting or deleting one or more idle or filler characters per channel at the same time to prevent the FIFO buffer stack 702 from underflowing or overflowing. In one implementation, the one or more filler characters are inserted or deleted from each channel only during an IPG interval.

If the read clock, RCLK in FIG. 2 for instance, is faster than the reference write clock, RFWCLK in FIG. 2 for instance, then the rate matching FIFO buffer stack 702 may underflow as characters are removed faster from the FIFO buffer stack 702 than they are written into the FIFO buffer stack 702. The rate matching system 204 may insert an idle or filler character, /R/ for instance, in each of the four input channels, at the same location in the character stream, to prevent underflow of the FIFO buffer stack 702. In another embodiment, the filler character may be inserted directly into the FIFO buffer stack 702 and the data counter 704 incremented.

If the read clock is slower than the reference write clock, then the FIFO buffer stack 702 may overflow as the characters are written faster to the FIFO buffer stack 702 than they are removed. The rate matching system 204 may remove an idle or filler character, such as an /R/ character, from each input channel, at the same location in the character stream, to prevent overflow of the FIFO buffer stack 702. In another embodiment, the filler character may be removed directly from the FIFO buffer stack 702 and the data counter 704 decremented.

It must be understood that this rate matching system 204 may also be implemented by inserting or removing characters from the FIFO buffer stack 702 rather than the incoming data channels.

Because a buffer has limited size, the rate matching system 204 may only be able to compensate up to a maximum frequency difference between a write clock and a read clock. In one implementation, this maximum frequency difference may be specified as plus or minus one cycle per ten thousand cycles. The rate matching system may compensate for larger frequency differences by increasing the size of the buffer 224.

The size of the buffer 224 may vary according to the particular implementation. Generally, a buffer may include sufficient storage locations to accommodate for synchronization latencies, overflow, and underflow. According to one embodiment, a buffer 224 may comprise a FIFO buffer stack, such as FIFO buffer stack 702, with one or more storage locations, each at least as wide as the total sum of the data bits on all channels. In one embodiment, the rate matching buffer 224 comprises a FIFO buffer stack six storage elements deep, each element forty-four bits wide.

In various embodiments, the rate matching control unit 220 may begin transmitting over the output channels, RM-Out (FIG. 2), when characters are stored in one or more storage elements. In one embodiment, the rate matching control unit 220 begins transmitting over the output channels, RM-Out (FIG. 2), when four of the storage elements are storing characters.

FIG. 8 illustrates how one embodiment of the rate matching system 204 (FIG. 2) may operate to prevent overflow and underflow of a six storage element buffer 702 using a data buffer counter 704 such as that illustrated in FIGS. 7A and 7B. However, this aspect of the invention may be extended to function with larger or smaller buffers and additional counters.

According to the example shown in FIG. 8, the rate matching control unit 220 (FIG. 2) begins processing the FIFO buffer stack 702 (FIG. 7A) when four storage elements are storing characters and the buffer data counter 704 reaches four. The buffer data counter 704 is incremented by one every time characters are stored at a new buffer storage element. Generally, when buffer characters are available for transmission, they are transmitted over output channels on every clock cycle.

Under normal operating conditions, the rate matching unit 220 (FIG. 2) transmits data from the FIFO buffer stack 702 (FIG. 7A) over the output channels, RM-Out (FIG. 2), decrementing the data counter 704 every time the characters in a buffer storage element are transmitted.

If the buffer data counter 704 decrements to two, then the rate matching control unit 220 may assume an underflow condition and insert a filler character on the next clock cycle. According to one embodiment, the filler character may be an idle character /R/. Generally, the rate matching control unit 220 inserts a filler character during the interval between two data packets, such as during an IPG. In one embodiment, a filler character is inserted into the output channels of the rate matching control unit. In another embodiment, the rate matching control unit 220 inserts a filler character into the buffer and increments the buffer data counter 704 by one.

If the buffer data counter 704 increments to six, then the rate matching control unit 220 may assume an overflow condition and delete the next available filler character. In one embodiment, the rate matching control unit 220 removes a filler character from the FIFO buffer stack 702 and decrements the buffer data counter 704 by one. In another embodiment, the rate matching control unit 220 removes a filler character from the FIFO buffer stack 702 and decrements the buffer data counter 704 by one.

Figure 9A:
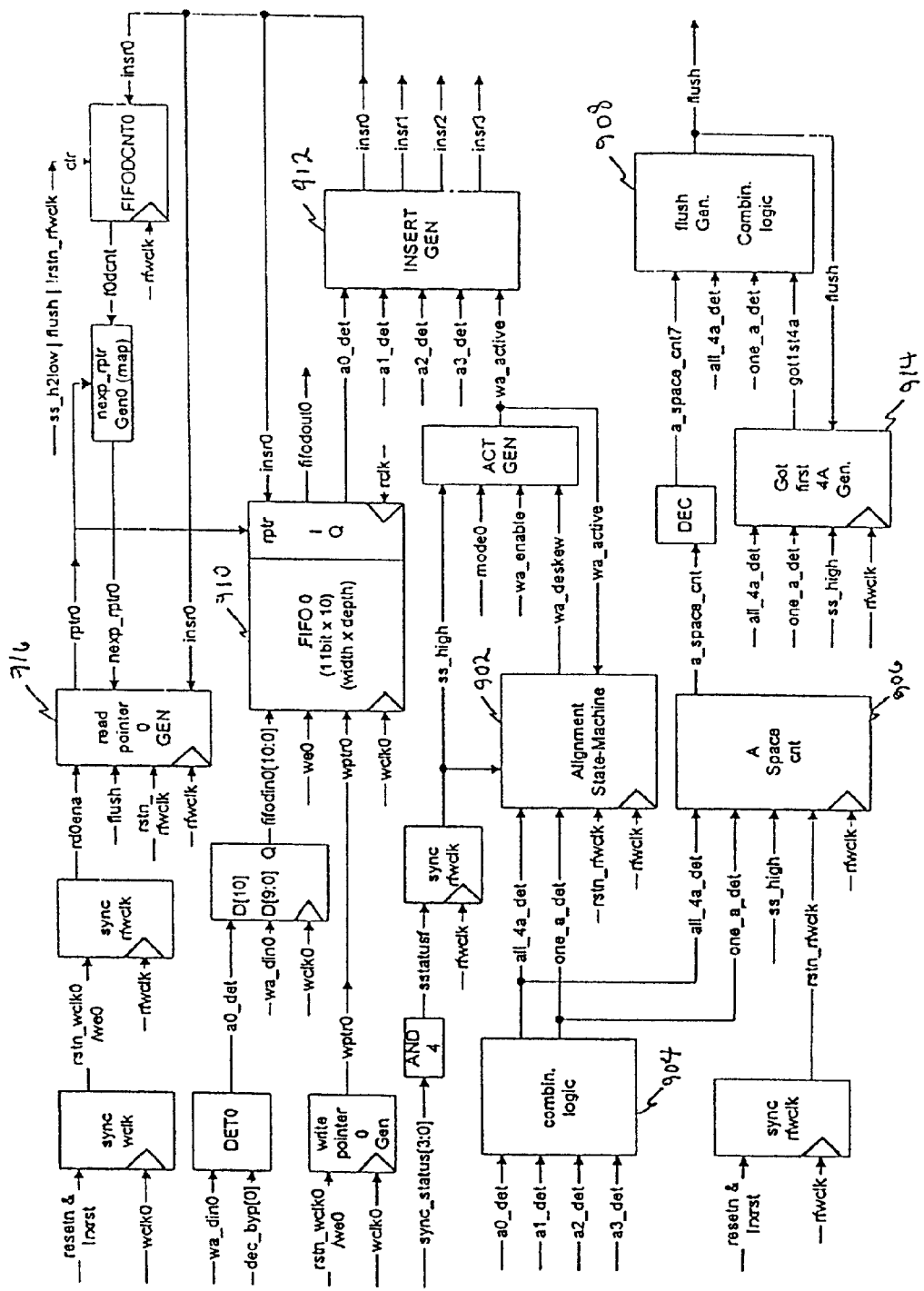
FIG. 9A is a block diagram illustrating one embodiment of the channel aligning system of the invention.

FIG. 9A provides a block-level diagram of one embodiment of the channel alignment aspect of the invention. In one embodiment, the system illustrated in FIG. 9A may be practiced within an integrated circuit device.

The channel alignment system may comprise an alignment state-machine 902 to control the reception and transmission of data. A control code detector may comprise combination logic 904 to detect an aligning character in a plurality of transmission channels. A logic device 914 may monitor when a first aligning character has been received on any input channel and when aligning characters have been received over all input channels. A counter 906 may monitor the number of characters between the first received alignment character on a first channel and subsequently received alignment characters on other channels. A read pointer generator and logic may serve to keep track of the storage location of each aligning character buffered on a FIFO 910. A flush generator may serve to flush the stalled data buffered in the FIFO 910 if an aligning character has not been detected on every input channel within a maximum number of characters after receiving the first aligning character. An insert generator 912 may serve to insert a filler character in each output channel where its corresponding input channel has received an aligning character. FIGS. 9B and 9C provide legends for the components and inputs and outputs illustrated in FIG. 9A.

Figure 10A:
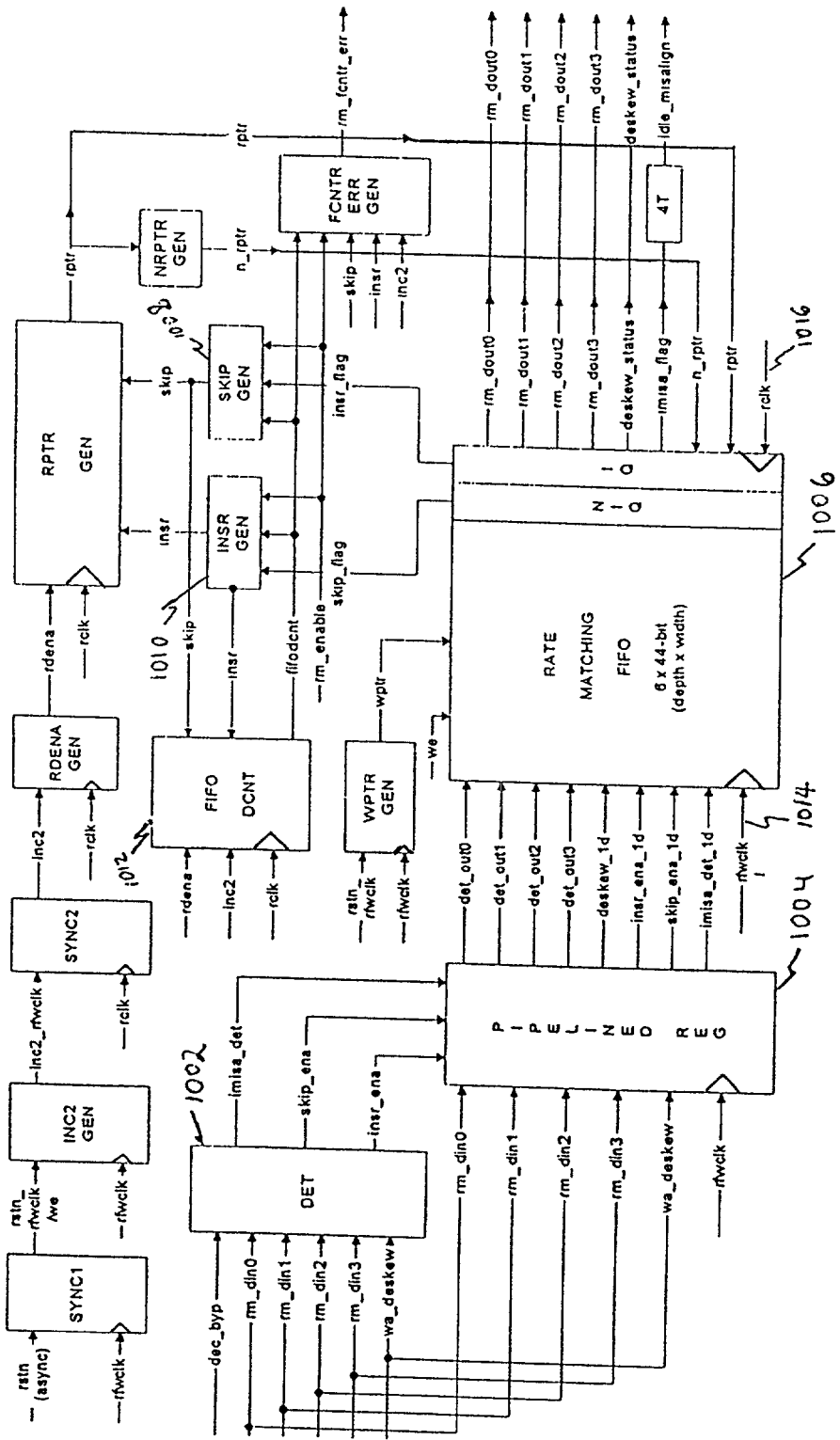
FIG. 10A is a block diagram illustrating one embodiment of the rate matching system of the invention.

FIG. 10A provides a block-level diagram of one embodiment of the rate matching aspect of the invention. In one embodiment, the system illustrated in FIG. 10A may be practice within an integrated circuit device.

The rate matching system may comprise a detector 1002 to detect idle characters and alignment characters. A pipelined device 1004 may further serve to monitor the number and type of characters detected. A rate matching FIFO 1006 may serve to buffer characters received synchronously with a reference write clock 1014 and transmit the buffered characters synchronously with a read clock 1016. An insertion generator 1008 may serve to insert filler characters into either the FIFO 1006 or the output channels (rm-dout) if an underflow condition is detected on the FIFO 1006. A skip generator 1010 may serve to skip or remove a filler character from the FIFO 1006 or the output channels (rm-dout) if an overflow condition is detected on the FIFO 1006. A FIFO data counter device 1012 may serve to monitor the number of data in the FIFO 1006 as new data is stored or stored data is removed. Additionally, the FIFO data counter device 1012 may be incremented or decremented depending on whether a filler character is inserted or removed by the insert generator or skip generator respectively. FIGS. 10B and 10C provide legends for the components and inputs and outputs illustrated in FIG. 10A.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, programmable devices, firmware, integrated circuits, software or a combination thereof where the software is provided in a processor readable storage medium such as a magnetic, optical, or semiconductor storage medium.

What is claimed is:

1. An apparatus comprising:
    a data alignment device including
        a plurality of input channels to receive a stream of input characters;
        a control code detector coupled to the plurality of input channels to detect the occurrence of an aligning character in each input channel;
        a plurality of buffers, each buffer coupled to one input channel to store the input characters received over that input channel;
        a plurality of output channels, each output channel coupled to one buffer and to a corresponding input channel to transmit a stream of characters from the corresponding buffer; and
        a control unit coupled to the control code detector and buffers, and configured to monitor the occurrence of an aligning character in each input channel, to hold the aligning character and subsequently received input characters for each input channel in the corresponding buffer until an aligning character has been detected on every input channel, then resume transmissions over all of the output channels starting with each aligning character on the corresponding buffers and then the subsequently received input characters in the order in which they were received,
        wherein the control unit to stop holding the aligning character and subsequently received input characters for each input channel in the corresponding buffer if an aligning character has not been detected on every input channel within a given period of time from the first detected aligning character.

2. The apparatus of claim 1 wherein
the control unit is configured to generate filler characters and transmit them over those output channels where an aligning character has been detected on its corresponding input channel.

3. The apparatus of claim 1 wherein
the control unit to stop generating and transmitting the filler characters once an aligning character has been detected on every input channel.

4. The apparatus of claim 1 wherein
the plurality of buffers are configured as first-in, first-out stacks.

5. The apparatus of claim 1 wherein
transmissions over the plurality of output channels includes digital transmissions.

6. The apparatus of claim 1 further comprising:
an output clock to transmit one character over each output channel on each clock cycle.

7. An apparatus comprising;
    a data alignment device including
        a plurality of input channels to receive a stream of input characters;
        a control code detector coupled to the plurality of input channels to detect the occurrence of an aligning character in each input channel;
        a plurality of buffers, each buffer coupled to one input channel to store the input characters received over that input channel;
        a plurality of output channels, each output channel coupled to one buffer and to a corresponding input channel to transmit a stream of characters from the corresponding buffer; and
        a control unit coupled to the control code detector and buffers, and configured to monitor the occurrence of an aligning character in each input channel, to hold the aligning character and subsequently received input characters for each input channel in the corresponding buffer until an aligning character has been detected on every input channel, then resume transmissions over all of the output channels starting with each aligning character on the corresponding buffers and then the subsequently received input characters in the order in which they were received, wherein the control unit stops holding the aligning character and subsequently received input characters for each input channel in the corresponding buffer if an aligning character has not been detected on every input channel within a given number of characters from the first detected aligning character.

8. The apparatus of claim 1 wherein the aligning character is the character /A/.

9. The apparatus of claim 1 wherein the filler character is the character /R/.

10. An apparatus comprising:
a data alignment device including
  a first plurality of input channels to receive a stream of input characters,
  a control code detector coupled to the plurality of input channels to detect the occurrence of an aligning character in each input channel,
  a plurality of buffers, each buffer coupled to one input channel to store the input characters received over that input channel,
  a first plurality of output channels, each output channel coupled to one buffer and to a corresponding input channel to transmit a stream of characters from the corresponding buffer, and
  a first control unit coupled to the control code detector and buffers, and configured to monitor the occurrence of an aligning character in each input channel, to hold the aligning character and subsequently received input characters for each input channel in the corresponding buffer until an aligning character has been detected on every input channel, then resume transmissions over all of the output channels starting with each aligning character on the corresponding buffers and then the subsequently received input characters in the order in which they were received; and
a rate matching device including
  a second plurality of input channels coupled to the plurality of output channels of the data alignment device to receive the output stream of characters from the data alignment device,
  a buffer coupled to the plurality of input channels to store the characters received over the input channels of the rate matching device,
  a second plurality of output channels coupled to the buffer and each output channel corresponding to one input channel of the rate matching device to transmit a stream of characters from the buffer, and
  a second control unit coupled to the buffer and configured to control the transmission of characters from the buffer, insert a filler character if an underflow condition is detected, and remove a filler character if an overflow condition is detected.

11. The apparatus of claim 10 further comprising:
a data counter to monitor the number of data stored in the buffer of the rate matching device at any one time.

12. The apparatus of claim 10 wherein the buffer of the rate matching device is configured as a first-in, first-out buffer stack with six storage elements.

13. The apparatus of claim 10 further comprising:
a control code detector for the rate matching device coupled to the plurality of input channels to detect the occurrence of an aligning character in each input channel for the rate matching device before initiating the transmission of characters from the buffer.

14. The apparatus of claim 10 wherein the second control unit of the rate matching device only removes or inserts the filler character during the interval between two data packets.

15. The apparatus of claim 10 wherein the buffer of the rate matching device comprises one buffer for each input channel to the rate matching device.

16. The apparatus of claim 10 wherein the second control unit of the rate matching device does not begin to transmit characters from the rate matching buffer until a plurality of characters have been stored in the rate matching buffer.

17. The apparatus of claim 10 wherein the transmission of characters from the buffer of the rate matching device is synchronous over all output channels for the rate matching device.

18. The apparatus of claim 10 wherein the apparatus comprises an integrated circuit device.

19. A method comprising:
aligning one or more transmission channels including,
  detecting the occurrence of an aligning character in a plurality of input channels;
  stalling the retransmission of the aligning character and the subsequently received characters for each transmission channel where an aligning character has been received until an aligning character has been detected on every input channel;
  buffering the aligning character and subsequently received characters for each input channel in a buffer until an aligning character has been detected on every input channel; and
  transmitting the stalled characters, starting with the aligning characters and continuing with the subsequently received characters once an aligning character has been received on every input channel.

20. The method of claim 19 further comprising:
resetting the buffer if an aligning character is not detected in every input channel within a maximum number of characters from the first received aligning character in any input channel.

21. The method of claim 19 wherein the aligning character is the character /A/.

22. The method of claim 19 further comprising:
transmitting one or more filler characters over an output channel corresponding to an input channel on which an aligning character has been detected until an aligning character has been detected in every input channel.

23. The method of claim 22 wherein the filler character is the character /R/.

24. A method comprising:
matching the transmission rates of a first clock to the transmission rates of a second clock including,
  receiving one or more characters over a plurality of input channels synchronized by the first clock,
  buffering the one or more characters received;
  transmitting the one or more buffered characters over one or more output channels synchronized by the second clock,
  inserting a filler character in each output channel if an underflow condition is detected, and
  removing a filler character in each output channel if an overflow condition is detected; and
aligning one or more transmission channels including,
  detecting the occurrence of an aligning character in the plurality of input channels;

stalling the retransmission of the aligning character and the subsequently received characters for each transmission channel where an aligning character has been received until an aligning character has been detected on every input channel; and transmitting the stalled characters, starting with the aligning characters and continuing with the subsequently received characters once an aligning character has been received on every input channel.

25. The method of claim 24 wherein
the matching of the transmission rates further includes, awaiting the synchronous detection of an aligning character in each input channel before initiating the transmission of the one or more buffered characters.

26. The method of claim 24 wherein
in matching the transmission rates, the removing and the inserting of the filler character only occurs during the interval between two data packets.

27. The method of claim 24 wherein
the transmission of the one or more buffered characters does not begin until a plurality of characters have been buffered.

28. The method of claim 24 wherein
the transmission of the one or more buffered characters is synchronous over all of the one or more output channels.

29. The apparatus of claim 7 wherein
the control unit is configured to generate filler characters and transmit them over those output channels where an aligning character has been detected on its corresponding input channel.

30. The apparatus of claim 7 wherein
the control unit to stop generating and transmitting the filler characters once an aligning character has been detected on every input channel.

31. The apparatus of claim 7 wherein
the plurality of buffers are configured as first-in, first-out stacks.

32. The apparatus of claim 7 wherein
transmissions over the plurality of output channels includes digital transmissions.

33. The apparatus of claim 7 further comprising:
an output clock to transmit one character over each output channel on each clock cycle.

34. The apparatus of claim 7 wherein
the aligning character is the character /A/.

35. The apparatus of claim 7 wherein
the filler character is the character /R/.

36. The apparatus of claim 7 wherein
the apparatus comprises an integrated circuit device.

37. The method of claim 19 wherein
first received characters are transmitted first.

38. The method of claim 19 wherein
transmitting the stalled characters comprises transmitting synchronously over all output channels.

39. The method of claim 24 further comprising:
resetting the buffer if an aligning character is not detected in every input channel within a maximum number of characters from the first received aligning character in any input channel.

40. The method of claim 24 wherein
the aligning character is the character /A/.

41. The method of claim 24 further comprising:
transmitting one or more filler characters over an output channel corresponding to an input channel on which an aligning character has been detected until an aligning character has been detected in every input channel.

42. The method of claim 41 wherein
the filler character is the character /R/.

43. The method of claim 24 wherein
first received characters are transmitted first.

44. The method of claim 24 wherein
transmitting the stalled characters comprises transmitting synchronously over all output channels.

* * * * *